(12) United States Patent
Morita

(10) Patent No.: US 11,989,470 B2
(45) Date of Patent: May 21, 2024

(54) IMAGE FORMING SYSTEM THAT COMBINES FIRST AND SECOND DATA, PRINTING DEVICE, CONTROL METHOD OF PRINTING DEVICE, AND NON-TRANSITORY STORAGE MEDIUM

(71) Applicant: CANON KABUSHIKI KAISHA, Tokyo (JP)

(72) Inventor: Naoki Morita, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/181,058

(22) Filed: Mar. 9, 2023

(65) Prior Publication Data
US 2023/0289120 A1    Sep. 14, 2023

(30) Foreign Application Priority Data
Mar. 14, 2022    (JP) .................................. 2022-039257

(51) Int. Cl.
*G06F 3/12*    (2006.01)
*G06K 15/02*    (2006.01)

(52) U.S. Cl.
CPC .......... *G06F 3/1243* (2013.01); *G06F 3/1205* (2013.01); *G06K 15/1807* (2013.01)

(58) Field of Classification Search
None
See application file for complete search history.

(56) References Cited

U.S. PATENT DOCUMENTS

| | | | | |
|---|---|---|---|---|
| 2004/0061900 | A1* | 4/2004 | Tanaka | H04N 1/00278 358/1.18 |
| 2008/0048432 | A1* | 2/2008 | Tsuchiya | B41J 29/393 283/67 |
| 2008/0204809 | A1* | 8/2008 | Miyashita | G06F 40/174 358/1.18 |
| 2008/0297834 | A1* | 12/2008 | Yamaguchi | G06F 3/1285 358/1.15 |
| 2019/0327372 | A1* | 10/2019 | Kawamoto | H04N 1/00427 |
| 2020/0128135 | A1* | 4/2020 | Matsushita | G06F 3/1243 |
| 2020/0301786 | A1* | 9/2020 | Uragaki | G06F 3/0619 |
| 2023/0236779 | A1* | 7/2023 | Mizoi | G06F 3/14 358/1.15 |

FOREIGN PATENT DOCUMENTS

JP    2007334701 A    12/2007

* cited by examiner

*Primary Examiner* — Henok Shiferaw
(74) *Attorney, Agent, or Firm* — ROSSI, KIMMS & McDOWELL LLP

(57) ABSTRACT

An image forming system includes an image distribution device and a printing device. The printing device forms a print image by combining a frame image data and a variable data, which are included in print image data managed by the image distribution device, the frame image data includes an image applied commonly to a plurality of print materials, and the variable data includes information changed for each print material. The printing device generates a list of pieces of attribute information about respective ones of a series of print images formed based on the print image data, and the pieces of attribute information are arranged in accordance with order in which the series of print images are printed and are presented as information that a user can identify. The printing device performs control so that respective ones of the series of print images and the list are printed.

8 Claims, 15 Drawing Sheets

FIG. 7A

| Device serial No.: abcd0101 | | |
|---|---|---|
| Application management | POP print > Server and shop information registration<br>Server and shop information registration | 701 |
| | Please input information in the respective fields below, and click the "OK" button  [OK] [Cancel]<br>POP server URL [ http://hogehoge/popserver/abcd/ ]<br>Shop ID [0001]<br>Password [**********] | |

FIG. 7B

| Device serial No.: abcd0101 | | |
|---|---|---|
| Application management | POP print > Selling area registration<br>Selling area registration | 711 |
| | Please input selling area below, and click the "OK" button  [OK] [Cancel]<br>[Selling area(1)] [Drink counter]<br>[Selling area(2)] [Daily dish counter]<br>[Selling area(3)] [Liquor counter]<br>[Selling area(4)] [ ]<br>[Selling area(5)] [ ]<br>[Selling area(6)] [ ]<br>[Selling area(7)] [ ] | |

FIG. 7C

| Device serial No.: abcd0101 | | | | | | | | | | | |
|---|---|---|---|---|---|---|---|---|---|---|---|
| Application management | POP print > Selling area registration<br>Selling area and category setting | | | | | | | | | | |
| | Please input selling area corresponding to category below, and click the "OK" button | | | OK | | Cancel | | | | | |
| | | | | Selling area | | | | | | | |
| | 100 | Processed food | | (1) | (2) | (3) | (4) | (5) | (6) | (7) | (8) |
| | | 101 | Luxury grocery item | | | | | | | | |
| | | 102 | Seasoning | | | | | | | | |
| | | 103 | Confectionary | | | | | | | | |
| | | 104 | Drink | ✓ | | | | | | | |
| | 110 | Liquor | | (1) | (2) | (3) | (4) | (5) | (6) | (7) | (8) |
| | | 111 | Liquor | | | | ✓ | | | | |
| | 120 | Japanese-style daily product | | (1) | (2) | (3) | (4) | (5) | (6) | (7) | (8) |
| | | 121 | Fish daily dish | ✓ | | | | | | | |
| | | 122 | Noodle | | | | | | | | |
| | 130 | Western-style daily product | | (1) | (2) | (3) | (4) | (5) | (6) | (7) | (8) |
| | | 131 | Egg | ✓ | | | | | | | |
| | | 132 | Dessert | | | | | | | | |
| | | 133 | Chilled food, drink | ✓ | | | | | | | |

| Product name | Base price | Comment | Size | Selling area |
|---|---|---|---|---|
| Water | 108 | Deep-sea water | 500ml | Drink counter |
| Sports drink | 150 | Best after sports | 500ml | Drink counter |
| Grilled sardine | 280 | For side dish of dinner | One | Daily dish counter |
| Japanese wine | 990 | Taste of Koshu grape | 750ml | Liquor counter |

IMAGE FORMING SYSTEM THAT COMBINES FIRST AND SECOND DATA, PRINTING DEVICE, CONTROL METHOD OF PRINTING DEVICE, AND NON-TRANSITORY STORAGE MEDIUM

BACKGROUND OF THE INVENTION

Field of the Invention

The present disclosure relates to an image forming system, a printing device, a control method of a printing device, and a non-transitory storage medium.

Description of the Related Art

As a scheme to provide a notification of product description or price at a storefront, a scheme to use a notice such as a point of purchase advertising (POP) is known. Under circumstances where a number of shops are deployed as with a so-called chain store, a system in which data used for printing such a POP is generated on a main store side and distributed to respective shops may be applied.

Further, there is a technology, which is also referred to as variable printing, for printing print materials, such as POPs, as print images in which frame image data applied commonly to a plurality of print materials such as a so-called template and variable data that is information changed on a print material basis are combined. Japanese Patent Application Laid-Open No. 2007-334701 discloses a technology related to such variable printing.

In a retail shop or the like having a plurality of selling areas, such as a supermarket, POPs for the next day may be printed collectively by using one or a few image forming devices and then replaced from previous POPs in several selling areas after the shop closes. On the other hand, the content of the POP may be changed day by day, and in such a circumstance, a worker has to always understand each information on a series of printed POPs and work by considering which POPs should be attached and where to attach the POPs, and this may be time consuming for the worker.

SUMMARY OF THE INVENTION

An image forming system according to the present invention is an image forming system including an image distribution device and a printing device, and the image forming system has: an image forming unit configured to form a print image by combining a first data and a second data, the first data and the second data being included in print image data managed by the image distribution device, the first data including an image applied commonly to a plurality of print materials, and the second data including information changed on a print material basis; a list generation unit configured to generate a list of pieces of attribute information about respective ones of a series of print images formed based on the print image data, the pieces of attribute information being arranged in accordance with order in which the series of print images are printed and being presented as information that a user can identify; and a control unit configured to perform control so that respective ones of the series of print images and the list are printed by the printing device.

Further features of the present invention will become apparent from the following description of exemplary embodiments with reference to the attached drawings.

BRIEF DESCRIPTION OF THE DRAWINGS

FIG. 7A is a diagram illustrating an example of a registration window for setting information.

FIG. 7B is a diagram illustrating an example of a registration window for setting information.

FIG. 7C is a diagram illustrating an example of a registration window for setting information.

FIG. 9 is a diagram illustrating an example of a list of print materials.

DESCRIPTION OF THE EMBODIMENTS

Preferred embodiments of the present disclosure will be described in detail below with reference to the attached drawings.

Note that, throughout the present specification and the drawings, components having substantially the same function and configuration are labeled with the same reference to omit duplicated description thereof.

INTRODUCTION

As a scheme to provide a notification of product description or price at a storefront, a scheme to use a notice such as a POP is known. In creating such POP data for product description, it is not necessarily effective to create POP data in each shop under the circumstances where a number of shops are deployed as with a so-called chain store, because individual shops may create similar data. In view of such a background, for example, a system in which POP data used respectively in a series of shops are collectively created on a head office side of the chain store and distributed to respective shops may be applied. Under the circumstances where such a system is applied, POP data is regularly updated on the head office side, and the shops access a server on the head office side via a terminal device such as a PC to acquire the POP data, for example. This enables the shop to use the acquired POP data and cause a printing device installed in the shop to print a POP that will be placed at the storefront.

Further, in a retail shop or the like having a plurality of selling areas, such as a supermarket, POPs for the next day may be printed collectively by using one or a few image forming devices and then replaced from previous POPs in several selling areas after the shop closes. On the other hand, the content of the POP may be changed day by day, and in such a circumstance, a worker has to always understand each information on a series of printed POPs and work by considering which POPs should be attached and where to attach the POPs, and this may be time consuming for the worker.

In view of the above circumstances, the present disclosure proposes an example of a mechanism that enables the user to easily understand information about each of a series of print materials to be printed (for example, POPs or the like).

System Configuration

Figure 1:
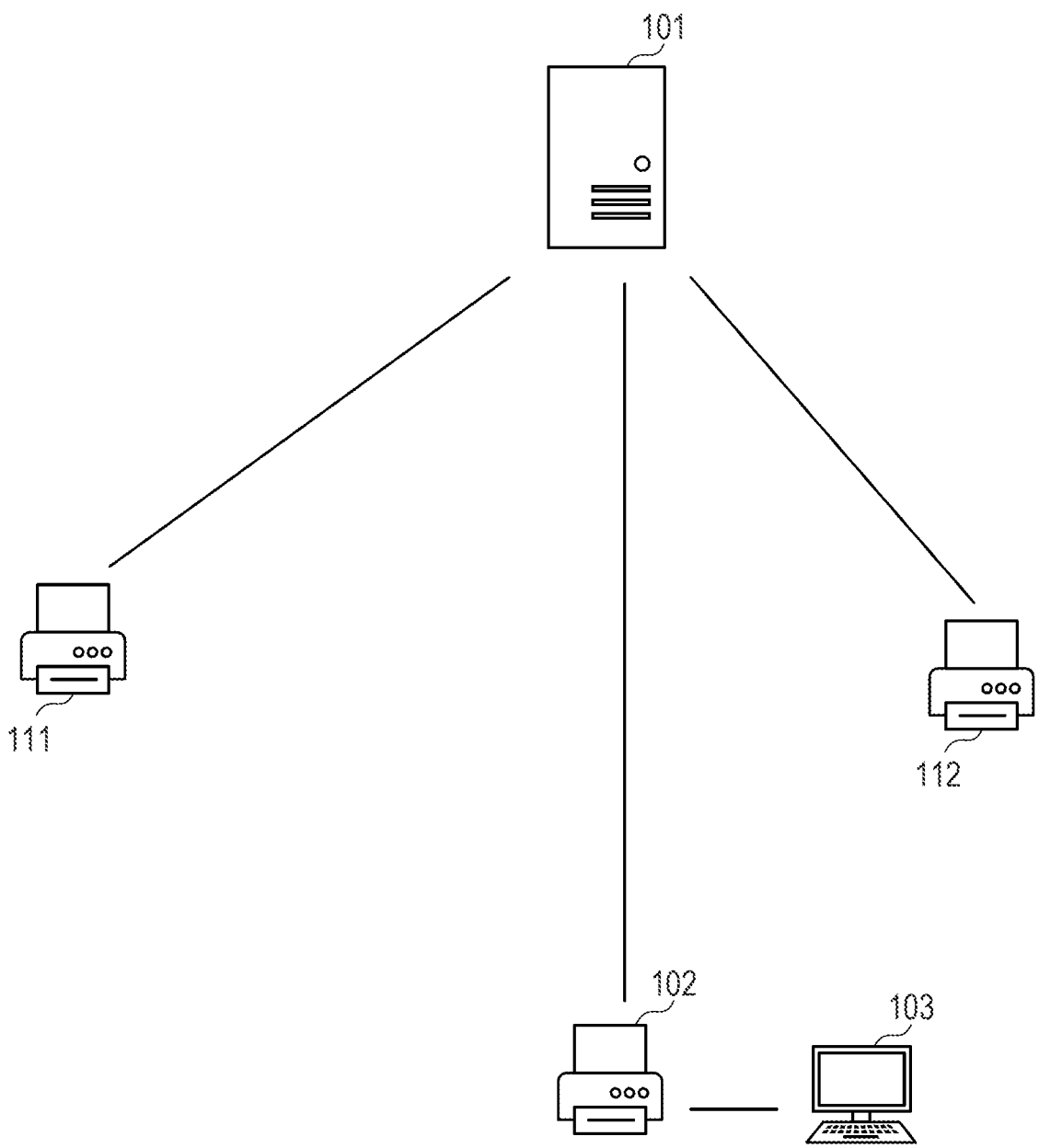
FIG. 1 is a diagram illustrating an example of a system configuration of an image forming system.

An example of a system configuration of an image forming system according to one embodiment of the present disclosure will be described with reference to FIG. 1. The image forming system according to the present embodiment includes an image distribution device 101 and a plurality of printing devices. Note that, in the example illustrated in FIG. 1, printing devices 102, 111, and 112 are provided as the plurality of printing devices. The image distribution device 101 and each of the printing devices 102, 111, and 112 are connected together so as to be able to transmit and receive information to and from each other via a predetermined network.

Note that, as long as the image distribution device 101 and each of the printing devices 102, 111, and 112 can be connected so as to be able to transmit and receive information to and from each other, the type of the network for this purpose is not particularly limited. As a specific example, the image distribution device 101 and each of the printing devices 102, 111, and 112 may be connected via a wired or wireless local area network (LAN). Further, as another example, the image distribution device 101 and each of the printing devices 102, 111, and 112 may be connected via a wide area network (WAN) or the Internet.

Further, an information processing device such as a personal computer (PC) may be connected to at least some of the printing devices. For example, in the example illustrated in FIG. 1, an information processing device 103 is connected to the printing device 102 via a predetermined network.

The image distribution device 101 manages data configuring print image (hereafter, also referred to as print image data) and information about various settings when printing the print image (hereafter, also referred to as setting information) and distributes the data and the information to another device via the network.

The image distribution device 101 according to the present embodiment manages, as print image data, frame image data applied commonly to a plurality of print materials and variable data that is information changed for each print material. The frame image data may be, for example, data corresponding to a template portion such as a frame in a print material such as a POP. Further, the variable data is data including information corresponding to a portion replaced for each print material such as a product name or a price in a print material such as a POP. Further, the image distribution device 101 according to the present embodiment manages setting information in which a combination of frame image data and variable data related to formation of a print image is indicated as the above setting information. This setting information is associated with targeted frame image data and variable data and distributed to external devices (for example, the printing devices 102, 111, and 112 or the like).

Note that the frame image data corresponds to an example of "first data", and the variable data corresponds to an example of "second data".

Each of the printing devices 102, 111, and 112 acquires print image data from the image distribution device 101, forms a print image based on the print image data, and then prints the print image on a recording medium such as a sheet. Note that, in the following description, although the printing device 102 is focused on for various description, the same may also apply to the printing devices 111 and 112.

The printing device 102 according to the present embodiment acquires frame image data and variable data as the print image data and acquires setting information in which a combination of the frame image data and the variable data is indicated as setting information corresponding to the print image data. In such a case, based on the setting information described above, the printing device 102 forms a print image by combining the above frame image data and the above variable data, prints the print image on a recording medium, and then discharges a print material in accordance with a print result to a predetermined output target.

The information processing device 103 serves as an interface for accessing the printing device 102 via a predetermined network such as a LAN to allow the user to check the status of the printing device 102 and set various information on the printing device 102.

The image forming system described with reference to FIG. 1 can be applied to a use case where POP data is created on a shop basis under a circumstance where a number of shops are deployed, such as a chain store, for example. In such a case, for example, an expected usage form may be such that the image distribution device 101 is installed on the head office side, each of the printing devices 102, 111, and 112 is installed in each shop, and a POP is then printed for each shop based on print image data created on the head office side.

Configuration Example of Image Distribution Device

An example of the configuration of the image distribution device 101 according to the present embodiment will be described with reference to FIG. 14 and FIG. 2 in terms of a hardware configuration and a software configuration, respectively.

First, an example of the hardware configuration of the image distribution device 101 will be described with reference to FIG. 14.

The image distribution device 101 includes a central processing unit (CPU) 1401, a read only memory (ROM) 1402, a random access memory (RAM) 1403, and a storage 1404. Further, the image distribution device 101 includes an operation unit interface (I/F) 1405, a display unit IN 1406, and a communication unit I/F 1407.

The CPU 1401 achieves to provide various functions implemented by the image distribution device 101 by controlling the operation of each component forming the image distribution device 101. Further, the CPU 1401 can transmit a control signal via a bus line to various components forming the image distribution device 101 described above and perform data communication with the various components via the bus line.

The ROM 1402 stores a control program executed by the CPU 1401.

The RAM 1403 is a main storage memory of the CPU 1401 and is used as a work area or a temporary storage area into which various programs are loaded.

The storage 1404 is a storage device that stores various data or various programs. The storage 1404 may be implemented by a nonvolatile memory or the like represented by a hard disk drive (HDD) or a solid state drive (SSD), for example.

The CPU 1401 loads a program stored in the ROM 1402 or the storage 1404 into the RAM 1403 and executes the program to control the operation of the image distribution device 101.

More specifically, the CPU 1401 executes basic software such as operating system (OS). Further, various applications operate on the OS in cooperation with each other, and thereby a process or various control for implementing a function desired by the user is performed.

The communication unit I/F 1407 is a network I/F for connecting the image distribution device 101 to a predetermined network to implement communication between the image distribution device 101 and an external device via the network. Note that, as described above, the type of the network used by the image distribution device 101 to communicate with the external device is not particularly limited. As a specific example, a wired LAN, a wireless LAN, a USB-LAN, or the like may be available as the network, and the configuration of the communication unit I/F 1407 may be changed as appropriate in accordance with the type of the network or the communication scheme to be used.

The operation unit I/F 1405 is an I/F for connecting the operation unit 1410 and the image distribution device 101 to each other. As the operation unit 1410, an input device for receiving an instruction from the user, such as a pointing device such as a mouse, a touch panel, or a keyboard, for example, is applied.

The display unit I/F 1406 is an I/F for connecting the display unit 1411 and the image distribution device 101 to each other. As the display unit 1411, for example, an output device such as a liquid crystal display for displaying various information on the screen to present the information to the user is applied.

Figure 14:
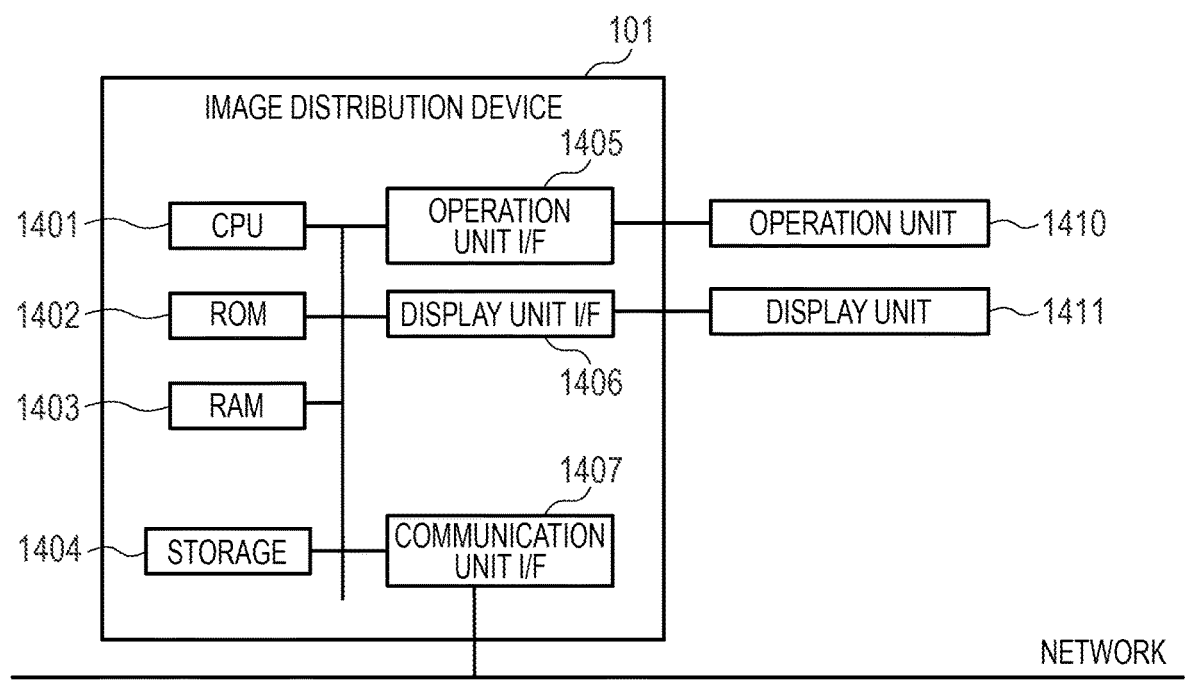
FIG. 14 is a diagram illustrating an example of a hardware configuration of the image distribution device.

Note that, although the operation unit 1410 and the display unit 1411 are implemented by external devices in the example illustrated in FIG. 14, this does not necessarily limit the configuration of the image distribution device 101 according to the present embodiment. As a specific example, at least any one of the operation unit 1410 and the display unit 1411 may be built in the image distribution device 101.

Next, as for an example of the software configuration of the image distribution device 101, a case where print image data is formed of frame image data and variable data will be focused on and described with reference to FIG. 2. Note that the data configuration of the print image data will be described separately later in detail with reference to FIG. 5.

The image distribution device 101 includes a frame image data creation unit 201, a variable data creation unit 202, a category data creation unit 203, a delivery data creation unit 204, a data transmission request receiving unit 205, and an image data transmission unit 206.

The frame image data creation unit 201 creates and registers frame image data to be applied commonly to a plurality of print materials, such as an overall design image of a print image (in other words, a template image, a background image, or the like) and holds the frame image data.

The variable data creation unit 202 creates and registers information replaced on a print material basis, such as a name or a price of a product, a comment, a category described later, or the like, or control information or the like applied to each print material and holds such information as variable data.

The category data creation unit 203 manages information indicating a category (classification) of a product, such as drink, confectionery, or the like, for example, and adds a new candidate for a category to be managed, deletes some of a series of candidates for categories to be managed, or the like. Note that the category will be described in detail later with reference to FIG. 5.

The delivery data creation unit 204 constructs a combination of frame image data and variable data used for printing the print material in accordance with a requested print material and generates print image data including the frame image data and the variable data in accordance with the combination. As a specific example, the delivery data creation unit 204 may individually generate print image data for each of external devices (for example, the printing devices 102, 111, and 112 or the like) that are candidates for a delivery target of the print image data used for printing the print materials requested by external devices.

The data transmission request receiving unit 205 receives a transmission request for print image data from an external device (for example, the printing devices 102, 111, and 112 or the like) and acquires print image data in accordance with the request from the delivery data creation unit 204. The data transmission request receiving unit 205 then instructs the image data transmission unit 206 for transmission of the print image data acquired from the delivery data creation unit 204. In response to the instruction from the data transmission request receiving unit 205, the image data transmission unit 206 transmits a targeted print image data to an external device that has requested the print image data.

Further, the data transmission request receiving unit 205 can receive a request related to transmission of not only print image data but also various data such as category data managed in the image distribution device 101 from the external device. When having received the request related to transmission of various data described above from the external device, the data transmission request receiving unit 205 acquires requested data from the data creation unit that manages the requested data and causes the image data transmission unit 206 to transmit the data to the requesting external device.

Note that, in the present embodiment, the data transmission request receiving unit 205 receives a request from an external device based on Hypertext Transfer Protocol (HTTP). Further, in such a case, for example, a URL query parameter or a POST method is utilized, and thereby the type of requested data is designated.

Figure 2:
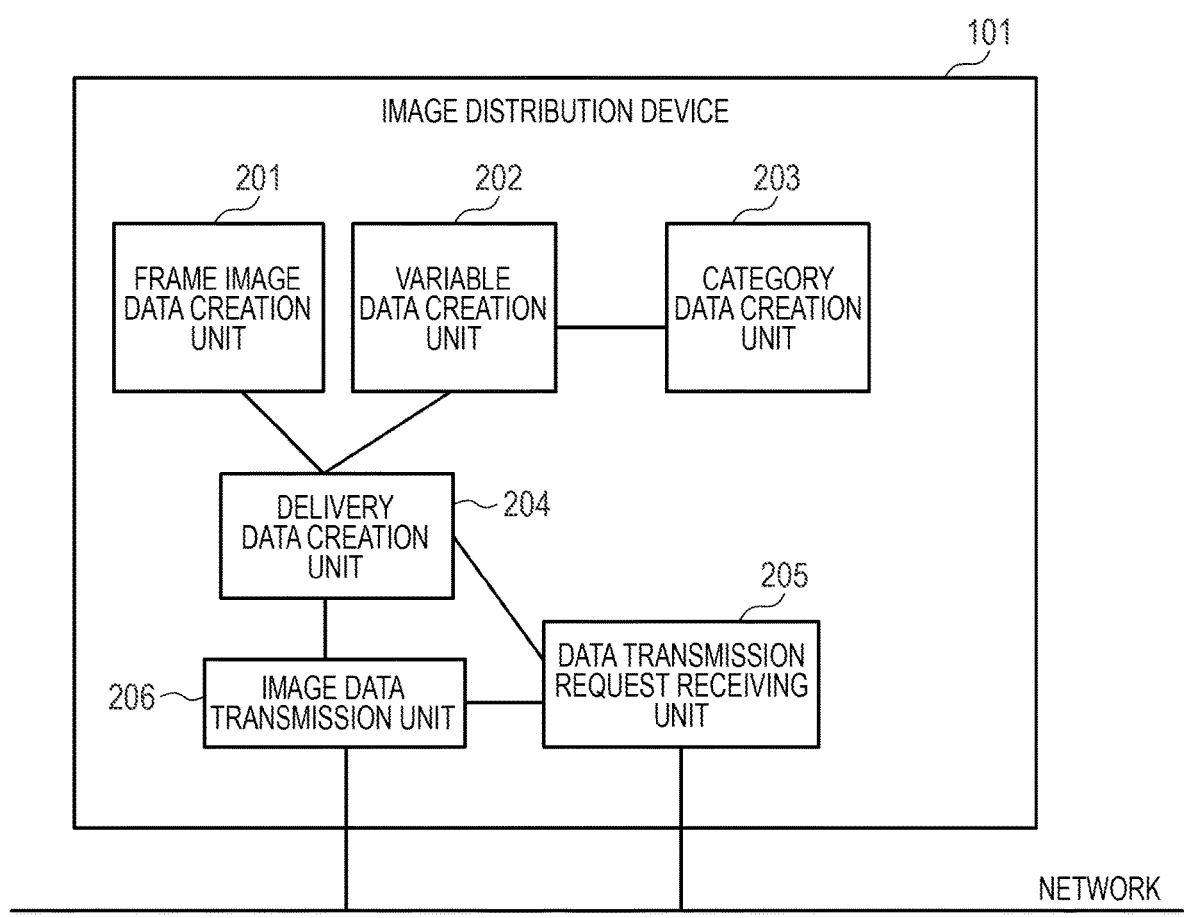
FIG. 2 is a diagram illustrating an example of a software configuration of an image distribution device.

Note that the configuration illustrated in FIG. 2 is only an example and is not intended to limit the software configuration of the image distribution device 101 according to the present embodiment. For example, some component may be added as appropriate in accordance with the function of the image distribution device 101. Further, the configuration illustrated in FIG. 2 may be implemented with cooperation of a plurality of devices. As a specific example, some of the components illustrated in FIG. 2 may be mounted outside the image distribution device 101. Further, as another example, the processing load of at least some of the series of components illustrated in FIG. 2 may be distributed over a plurality of devices.

Configuration Example of Printing Device

An example of the configuration of the printing device applicable as the printing devices 102, 111, and 112 will be described with reference to FIG. 3 and FIG. 4 in terms of the hardware configuration and the software configuration, respectively. Note that, although the printing device 102 will be described in this section, the same applies to the printing devices 111 and 112.

First, an example of the hardware configuration of the printing device 102 will be described with reference to FIG. 3.

The printing device 102 includes a CPU 301, an embedded multi-media card (eMMC) 302, a dynamic random access memory (DRAM) 303, and a storage device 304. Further, the printing device 102 includes an operation unit 305, a recording unit 306, an image processing unit 307, and a communication unit 308. Respective components of the printing device 102 described above are connected so as to be able to transfer information with each other via a data bus 309.

The CPU 301 corresponds to a control unit of the printing device 102 and controls the overall operation of the device.

The eMMC 302 is a storage area of the CPU 301 for storing a control unit program or the like. The eMMC 302 may be implemented by using a storage device such as a flash memory, for example.

The DRAM 303 is a storage area used for storing program control variables or the like. The DRAM 303 may be implemented by using a volatile memory that can temporarily hold image data or the like processed by the CPU 301, for example. Further, the DRAM 303 may be used as a main storage memory of the CPU 301. That is, the DRAM 303 may be used as a work area or a temporary storage area into which various programs are loaded.

The storage device 304 is a storage area that stores various data such as image data. The storage device 304 may be implemented by using a nonvolatile storage device such as an HDD, for example. For example, various data used for printing (for example, print image data or the like) may be stored in the storage device 304.

The operation unit 305 is a user interface for presenting various information to the user or receiving various instructions from the user. For example, the operation unit 305 may be implemented by using a display used for presenting information to the user or a touch panel, a button, a switch, or the like used for receiving an instruction from the user.

The recording unit 306 is a device for printing a print image rendered based on image data on a recording medium such as a sheet. As a specific example, the recording unit 306 places toner on a recording medium, presses the toner and the recording medium by a heated fixer, and thereby fixes the toner to the recording medium.

The image processing unit 307 performs image data synthesis, print image rendering based on the image data, a coding process or a decoding process on binary data of the rendered print image, and the like.

The communication unit 308 is a communication interface used for the printing device 102 to access a network and transmit and receive data to and from an external device. The configuration applied as the communication unit 308 may be changed as appropriate in accordance with the type of the network or an applied communication scheme.

Figure 3:
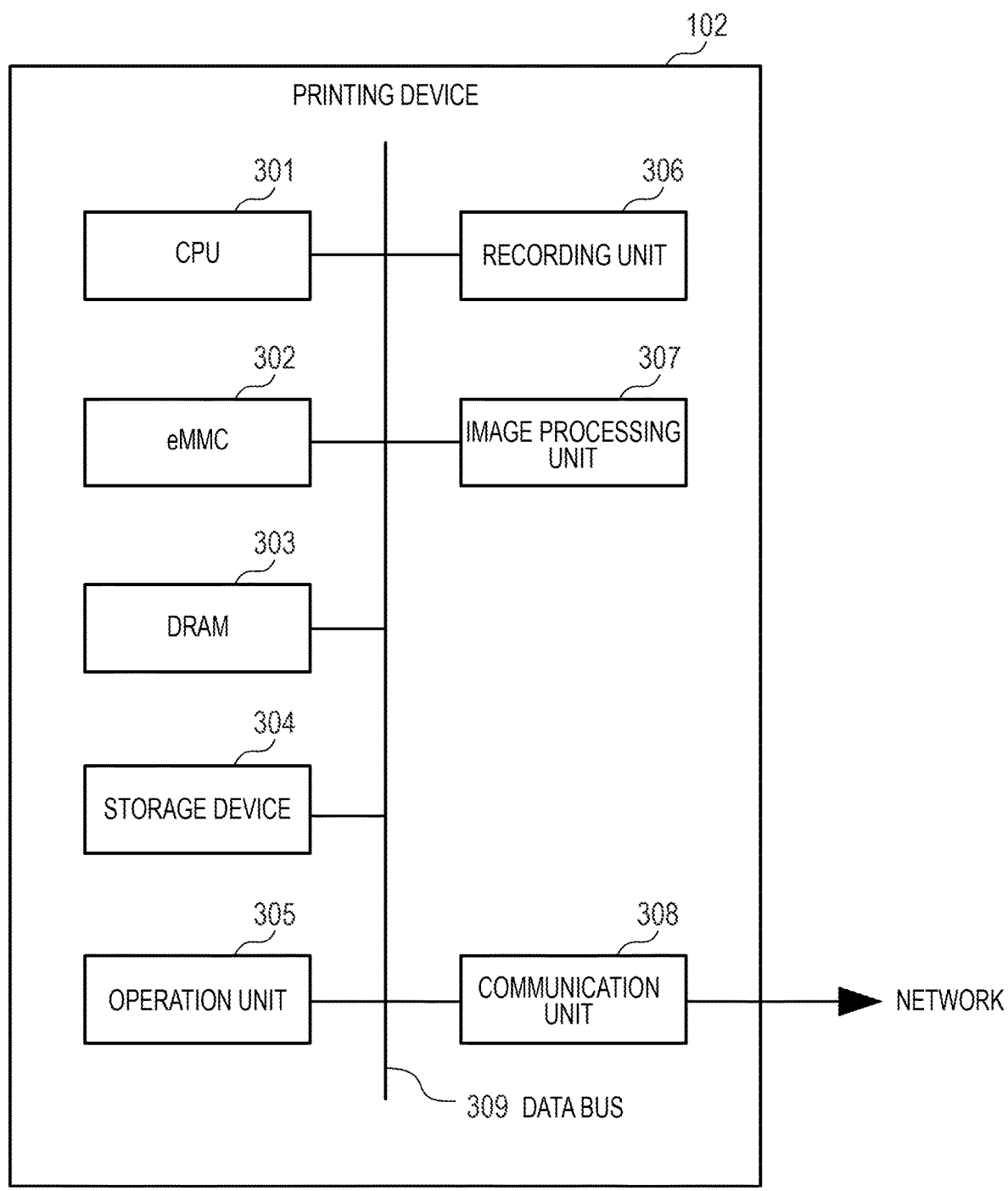
FIG. 3 is a diagram illustrating an example of a hardware configuration of a printing device.

Note that the configuration illustrated in FIG. 3 is only an example and is not intended to limit the configuration of the printing device 102 according to the present embodiment. For example, some component may be added as appropriate in accordance with the function of the printing device 102. Further, the configuration illustrated in FIG. 3 may be implemented with cooperation of a plurality of devices. As a specific example, some of the components illustrated in FIG. 3 may be mounted outside the printing device 102. Further, as another example, the processing load of at least some of the series of components illustrated in FIG. 3 may be distributed over a plurality of devices.

Next, an example of the software configuration of the printing device 102 will be described with reference to FIG. 4. The printing device 102 includes a print image forming unit 401, a print control unit 402, a POP print application 403, and a web server 404. A series of software illustrated in FIG. 4 is stored in the eMMC 302, for example, read by the CPU 301 and loaded into the DRAM 303, and then executed by the CPU 301.

The POP print application 403 is application software for implementing a function provided to the user by the printing device 102. For example, the POP print application 403 performs user interface control via the operation unit 305 or the web server 404 described later, a process of communication with the image distribution device 101 via the communication unit 308, or the like. Further, the POP print application 403 performs print image formation using the print image forming unit 401, printing using the print control unit 402, or the like.

The print image forming unit 401 uses the image processing unit 307 to create printing data used for performing printing based on input data. In the present embodiment, the print image forming unit 401 forms a print image by combining frame image data and variable data described later with reference to FIG. 5 and then creates printing data based on the print image.

The print control unit 402 performs printing by using the recording unit 306 based on input printing data.

The web server 404 functions as a web server that receives a request from an external device via the communication unit 308, transmits a response to the external device, or the like. In the present embodiment, using the information processing device 103 to access the web server 404 allows the user to designate various settings related to the POP print application 403.

Figure 4:
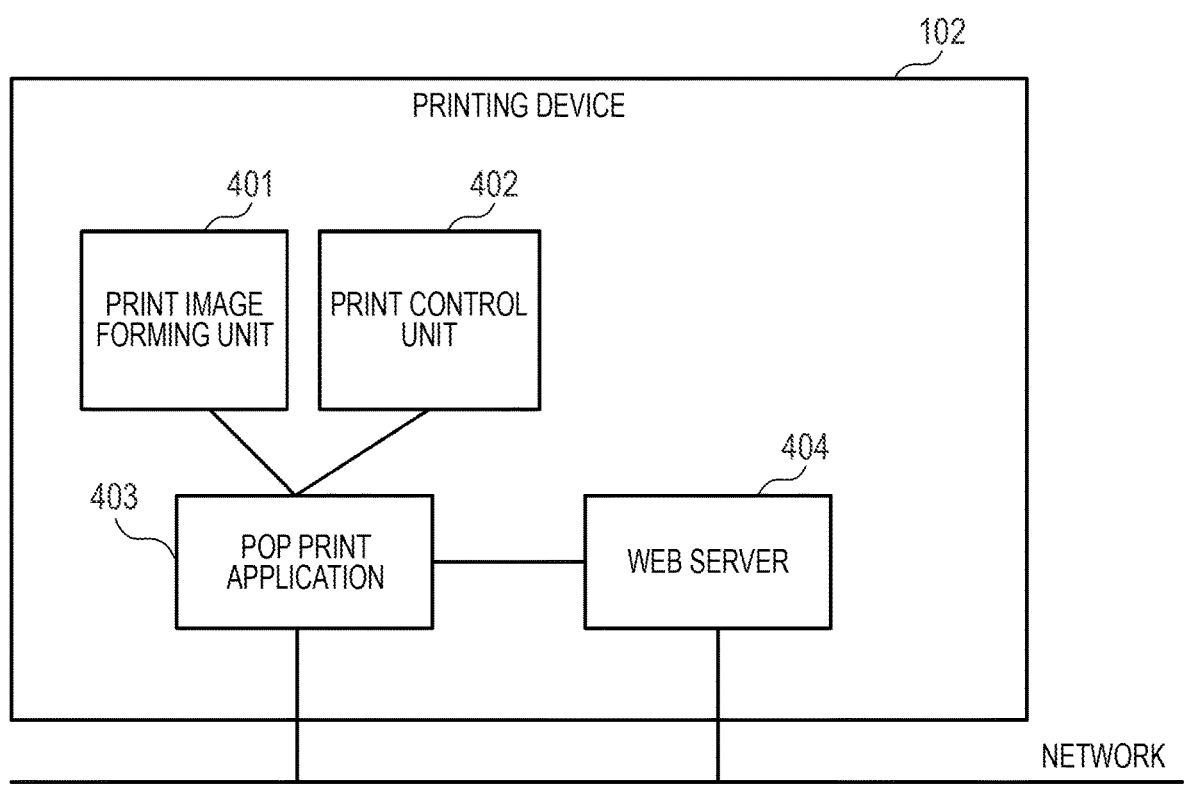
FIG. 4 is a diagram illustrating an example of a software configuration of the printing device.

Note that the configuration illustrated in FIG. 4 is only an example and is not intended to limit the software configuration of the printing device 102 according to the present embodiment. For example, some component may be added as appropriate in accordance with the function of the printing device 102. Further, the configuration illustrated in FIG. 4 may be implemented with cooperation of a plurality of devices. As a specific example, some of the components illustrated in FIG. 4 may be mounted outside the printing device 102. Further, as another example, the processing load of at least some of the series of components illustrated in FIG. 4 may be distributed over a plurality of devices.

Print Image Data

Figure 5:
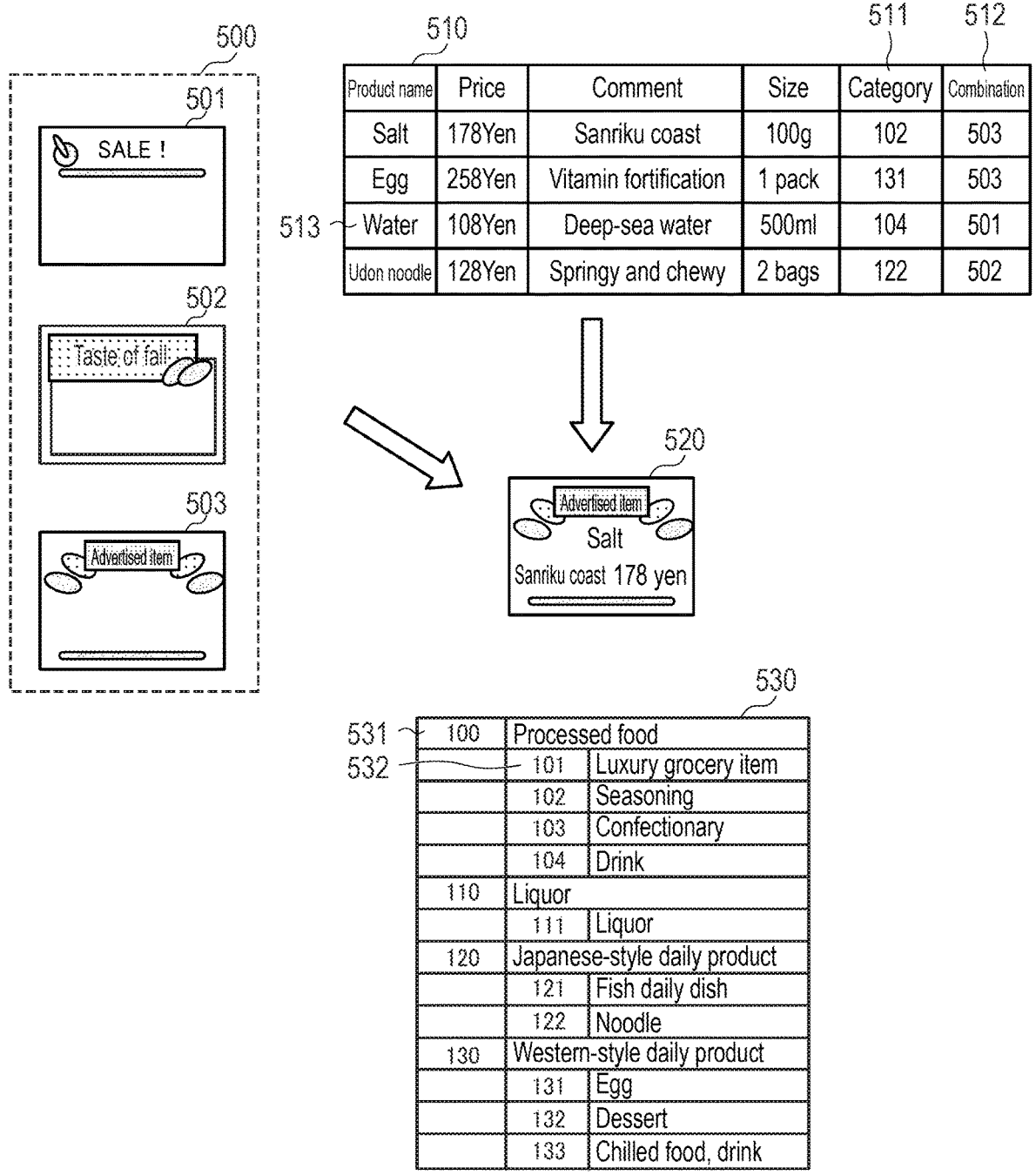
FIG. 5 is a diagram illustrating an example of print image data.

An example of print image data created and registered and then held by the image distribution device 101 will be described with reference to FIG. 5. The print image data illustrated in FIG. 5 is formed of frame image data 500 and variable data 510.

The frame image data 500 is data including an image applied commonly to a plurality of print materials as described above and corresponds to a portion of a template representing a general frame design of a print image, such as a frame in a print material such as a POP, for example. For example, each of references 501, 502, and 503 schematically illustrates a candidate for data to be used as the frame image data 500.

The variable data 510 includes information to be replaced for each print material such as a product name, a price, a comment, a size, or the like used for a POP, for example, as described above. Further, the variable data 510 includes information such as a category 511, a combination 512, and the like described later. The variable data 510 may include various information illustrated above as an example as text data, for example.

The category 511 is attribute information indicating a category associated with a targeted print material, and a value defined in category data 530 described later may be set therefor. As a specific example, the value defined in the category data 530 described above may be set for the category 511 as text data, for example.

The combination 512 is attribute information indicating frame image data that is a counterpart to be combined with variable data for forming a print image 520 corresponding to a print material indicated by the variable data, and information for identifying the frame image data may be set as the value thereof. As a specific example, a value indicating, as text data, information for identifying a targeted frame image data may be set for the combination 512.

The category data 530 is data for managing the classification when distinguishing a target of printing (for example, a product). For example, in the example illustrated in FIG. 5, the category data 530 is used to manage a large classification 531 indicating a broad classification and a small classification 532 classified in more detail from the large classification 531 as classifications for distinguishing a product to be printed. As a specific example, "Processed food", "Liquor", and the like are defined as the large classification 531, and "Confectionary", "Drink", and the like are defined as the small classification 532.

The frame image data 500 and the variable data 510 described above are combined, and thereby a print image to be used in printing is formed. For example, the reference 520 indicates a POP image used in printing of a POP as an example of a print image formed by the frame image data 500 and the variable data 510. As a specific example, the frame image data 503 and information about the product name "Salt" in the variable data 510 are combined, and thereby the print image 520 illustrated in FIG. 5 is formed.

Process

An example of the process of the image forming system according to the present embodiment will be described.

First, an example of an overall process flow of the image forming system according to the present embodiment will be described with reference to FIG. 6. Note that, in the example illustrated in FIG. 6, for better understanding of the feature of the image forming system according to the present embodiment, a use case is applied where POP data is created on a shop basis under the circumstance where a plurality of shops are expanded as with chain stores. Specifically, transferring of information will be described which takes place between the image distribution device 101, the printing device 102, and the information processing device 103 under a circumstance where the image distribution device 101 is installed on the head office side and the printing device 102 and the information processing device 103 are installed on the shop side.

In S601, the image distribution device 101 adds or deletes a category in accordance with an instruction from the user on the head office side. This process is performed by the category data creation unit 203.

In S602, the image distribution device 101 registers the frame image data 500 distributed to respective printing devices, that is, registers the frame image data 500 to be used in generation of a print image. This process is performed by the frame image data creation unit 201.

In S603, the image distribution device 101 registers the variable data 510 distributed to respective printing devices (for example, the printing device 102), that is, registers the variable data 510 to be used in generation of a print image. This process is performed by the variable data creation unit 202.

Note that addition or deletion of a category in S601, registration of the frame image data 500 in S602, and registration of variable data in S603 may be performed in accordance with an instruction from a manager or the like via a predetermined user interface, for example.

In S604, the image distribution device 101 sets a combination of the frame image data 500 and the variable data 510 used for generating a print image (for example a print image of a print material used in a shop where the printing device is installed) to be distributed to respective printing devices.

In the present embodiment, information about a combination of data registered in S604 is held as the combination 512 in the variable data 510.

In S605, the information processing device 103 accesses the printing device 102 via the web server 404 in accordance with an instruction from the user on the shop side and thereby registers information about a server that is a source of acquisition of print image data or information about a targeted shop.

An example of a registration window for receiving an instruction related to information registration in S605 (hereafter, also referred to as server and shop information registration) from the user will now be described with reference to FIG. 7A. A registration window 701 illustrated in FIG. 7A can receive designation of a URL of the image distribution device 101 that is a source of acquisition of print image data and an ID and a password allocated to a shop which the printing device 102 belongs to. The POP print application 403 stores and thereby holds information designated via the registration window 701 in a predetermined storage region.

FIG. 6 is now referenced again. In S606, the printing device 102 confirms access to the image distribution device 101 based on the information designated via the registration window 701. This process is performed by the POP print application 403. Note that, in this step, when access to the image distribution device 101 fails, the printing device 102 notifies the user on the shop side of the information indicating this via the web server 404.

In S607, the information processing device 103 accesses the printing device 102 via the web server 404 in response to an instruction from the user on the shop side and thereby registers information about a selling area of a targeted shop (in other words, a place to use a print material such as a POP).

An example of the registration window for receiving a user instruction related to information registration about a selling area of a targeted shop in S607 (hereafter, also referred to as selling area registration) will now be described with reference to FIG. 7B. A registration window 711 illustrated in FIG. 7B can receive designation of information indicating each selling area in the targeted shop. In the example illustrated in FIG. 7B, "Drink counter", "Daily dish counter", and "Liquor counter" are designated as information indicating selling areas to be registered for the targeted shop.

FIG. 6 is now referenced again. In the process of S608 to S609, the information processing device 103 accesses the printing device 102 via the web server 404 in response to an instruction from the user on the shop side and thereby configures a setting of a selling area category for the targeted shop. The setting of a selling area category is a setting related to the association between each selling area of the targeted shop and the category of a print material managed by the image distribution device 101 as category data.

Specifically, in S608, the information processing device 103 inquires the printing device 102 about display of a setup window used for setting a selling area category. Note that an example of this setup window will be described later in detail with reference to FIG. 7C.

In S609, the printing device 102 requests the image distribution device 101 for transmission of category data in response to inquiry from the information processing device 103 in S608. This process is performed by the POP print application 403. Further, this request is received by the data transmission request receiving unit 205 of the image distribution device 101. Note that, in the present embodiment, the POP print application 403 utilizes HTTP to request the data transmission request receiving unit 205 for transmission of category data. In such a case, for example, the POP print application 403 may utilize the POST method defined by HTTP to designate category data as data to be requested.

The printing device 102 then causes the information processing device 103 to display a setup window used for receiving a user instruction related to a setting of a selling area category via the web server 404 based on the category data transmitted back from the image distribution device 101 and on the selling area information held by itself.

An example of the setup window for receiving a user instruction related to a setting of a selling area category will now be described with reference to FIG. 7C. A setup window 721 illustrated in FIG. 7C presents a list of checkboxes where a series of categories managed by the category data are indicated in a vertical axis direction, respectively, and a series of selling areas managed as the selling area information are indicated in the horizontal axis direction, respectively. In the setup window 721, once a desired checkbox is checked, a category corresponding to the position in the vertical axis direction of the checkboxes and a selling area corresponding to the position in the horizontal axis direction of the checkboxes are associated with each other.

As a specific example, in the registration window 711 illustrated in FIG. 7B, "Drink counter" is registered as "Selling area (1)". Further, in the setup window 721 illustrated in FIG. 7C, a checkbox at the position corresponding to the category indicated as "104 Drink" is checked for "Selling area (1)". That is, in such a case, the category indicated as "104 Drink" will be associated with a selling area registered as "Drink counter".

Further, as another example, in the registration window 711 illustrated in FIG. 7B, "Daily dish counter" is registered as "Selling area (2)". Further, in the setup window 721 illustrated in FIG. 7C, checkboxes at the positions corresponding to categories indicated as "121 Fish daily dish", "131 Egg", and "133 Chilled food, drink" are checked for "Selling area (2)". That is, in such a case, the categories indicated as "121 Fish daily dish", "131 Egg", and "133 Chilled food, drink" will be associated with the selling area registered as "Daily dish counter".

Similarly, in the registration window 711 illustrated in FIG. 7B, "Liquor counter" is registered as "Selling area (3)". Further, in the setup window 721 illustrated in FIG. 7C, a checkbox at the position corresponding to a category indicated as "111 Liquor", is checked for "Selling area (3)". That is, in such a case, the category indicated as "111 Liquor" will be associated with the selling area registered as "Liquor counter".

The information that is designated via the setup window 721 illustrated as an example in FIG. 7C and indicates the association between each selling area of a targeted shop and categories of print materials managed as category data is held by the POP print application 403 as selling area category setting information.

FIG. 6 is now referenced again. In S610, the printing device 102 starts the POP print application 403 in response to an instruction related to calling of the POP print application 403 from the user on the shop side. Note that, in the present embodiment, the printing device 102 presents an application calling window (not illustrated) to the user via the operation unit 305 and starts the above POP print application 403 in response to an instruction from the user via the window.

Figure 10:
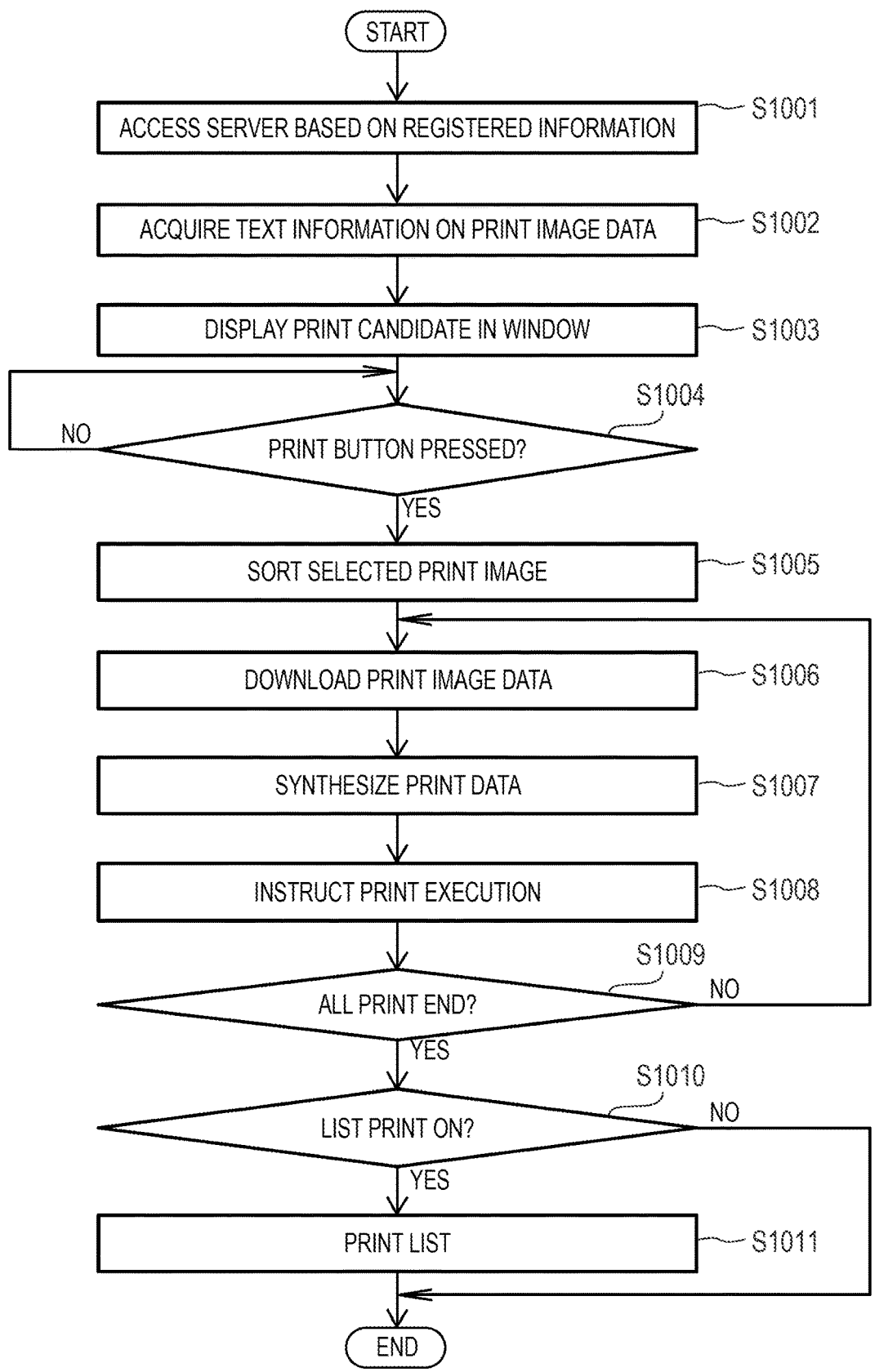
FIG. 10 is a flowchart illustrating an example of a process of the printing device.

A series of processes from S611 to S617 correspond to a process related to collective printing of a series of print images indicated by print image data. Accordingly, a flow of the POP print process implemented by the POP print application 403 will be described as an example of a process related to the collective printing of a series of print images with reference to FIG. 10. For example, a series of processes illustrated in FIG. 10 are implemented when the CPU 301 of the printing device 102 loads a program of the POP print application 403 stored in the eMMC 302 or the storage device 304 into the DRAM 303 and executes the program. Note that, in the example illustrated in FIG. 10, for better understanding of the feature, each process will be described as being performed by the POP print application 403 as the subject to simplify the illustration.

In S1001, the POP print application 403 accesses the data transmission request receiving unit 205 of the image distribution device 101 based on the server and shop information held in S605.

In S1002, the POP print application 403 acquired, from the data transmission request receiving unit 205, delivery-scheduled variable data related to print image data that is based on the data combination information and variable data described with reference to FIG. 2 and is scheduled to be delivered to the printing device 102.

Figure 6:
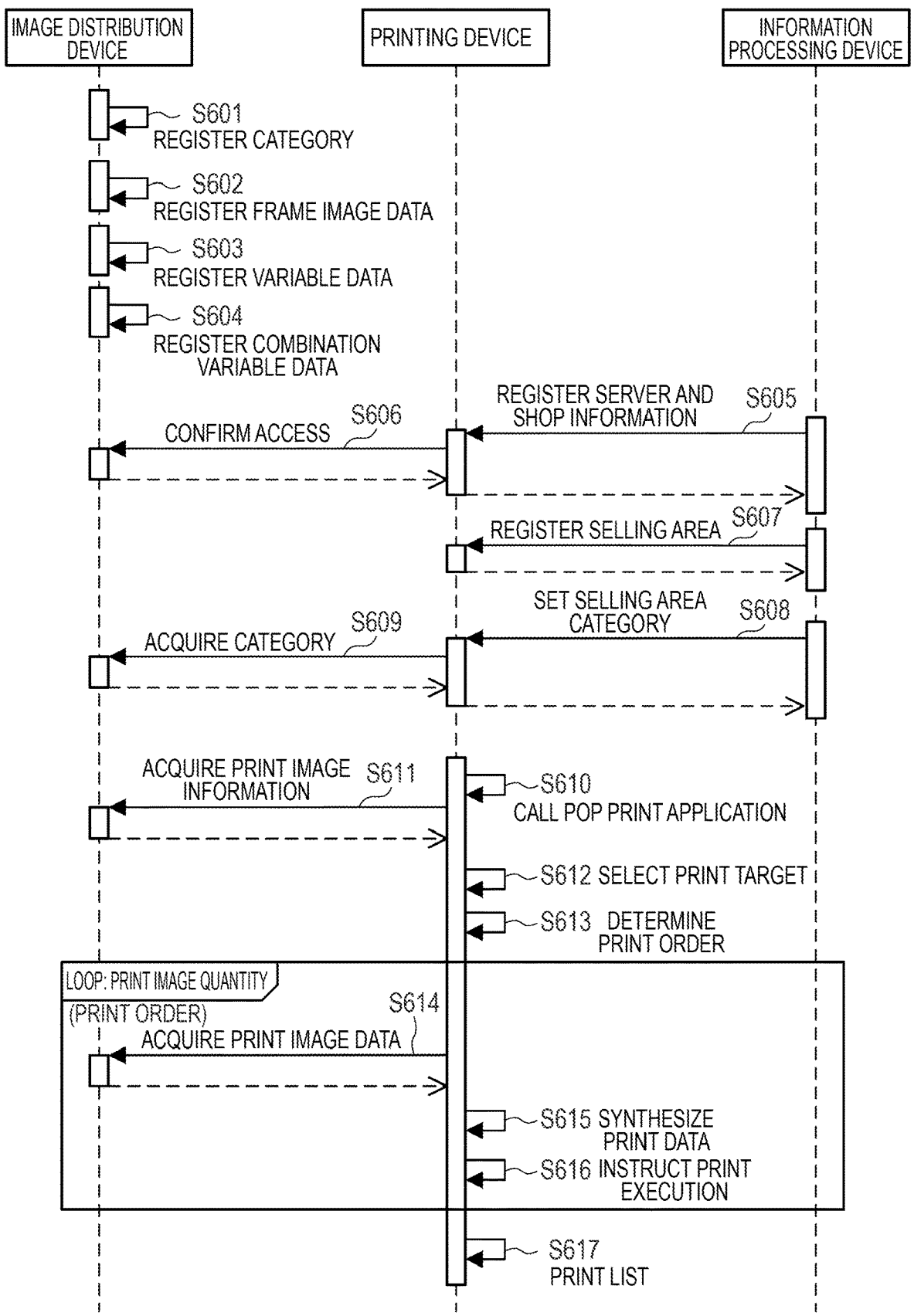
FIG. 6 is a sequence diagram illustrating an example of a process of the image forming system.

Note that the processes of S1001 to S1002 correspond to the process of S611 illustrated in FIG. 6.

In S1003, the POP print application 403 matches the category in text data included in the delivery-scheduled variable data acquired in S1002 with the selling area category information. Then, as a candidate utilized for generation of a print image of a print material to be printed by the printing device 102, the POP print application 403 extracts variable data having a category associated with some selling area defined in the selling area category information.

Figure 8A:
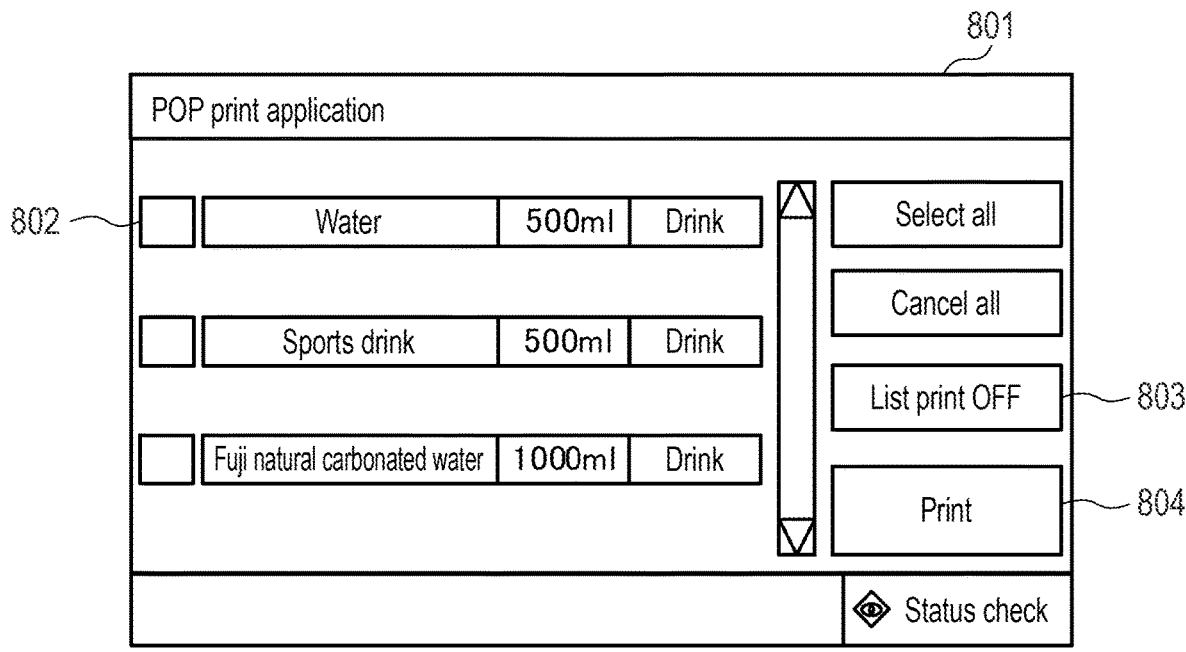
FIG. 8A is a diagram illustrating an example of a print execution instruction window.
Figure 8B:
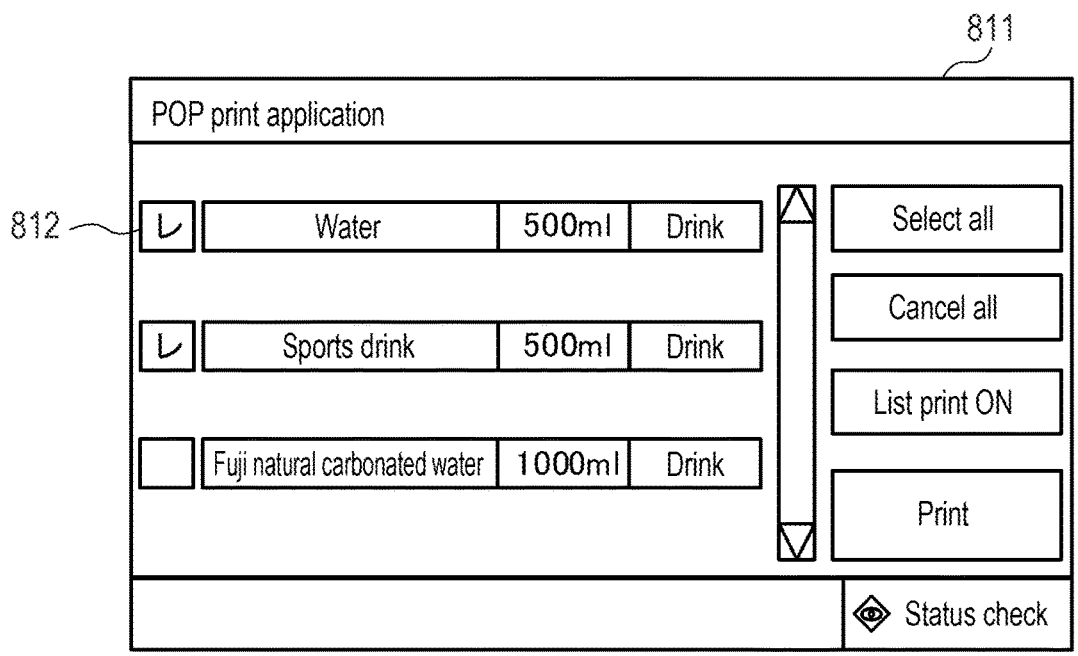
FIG. 8B is a diagram illustrating an example of a print execution instruction window.

Further, the POP print application 403 causes print execution instruction windows illustrated in FIG. 8A and FIG. 8B to be displayed on the operation unit 305. Each window illustrated in FIG. 8A and FIG. 8B illustrates an example of an operation window for the POP print application 403 to receive an instruction related to execution of printing from the user.

Each of print execution instruction windows 801 and 811 displays candidates for print images to be printed in a list form that can be vertically scrolled.

Checkboxes 802 are user interfaces for receiving designation of a print image to be actually printed from the user out of a series of print image candidates displayed as a list.

Once an operation is made on a checkbox by the user, the checkbox is checked, and when an operation is again made on the checkbox, the check is removed. Under such control, when a state where the checkbox is checked is resulted, one or more candidates for the print image associated with the checkbox are set as a target of printing. The same applies to the checkboxes 812 in the print execution instruction window 811 illustrated in FIG. 8B.

A list print instruction button 803 is a button for receiving an instruction from the user as to whether or not to print a list of print materials to be printed. For example, the list print instruction button 803 may be implemented as a toggle button where an ON-state corresponding to a case of performing printing of the list and an OFF-state corresponding to a case of not performing printing of the list are selectively switched when pressed. When the list print instruction button 803 is in the ON-state, a collective print process of a series of print images set as a print target is performed, and a list of print materials corresponding to respective ones of the series of print images are then printed.

A print execution instruction button 804 is a button for receiving an instruction related to execution of printing from the user. Once the print execution instruction button 804 is pressed, an instruction related to printing of a print image in accordance with the state of the checkbox 802 and an instruction related to printing of a list in accordance with the state of the list print instruction button 803 are provided to the POP print application 403.

As a specific example, it is assumed that data with a category of "Luxury grocery item" and data with a category of "Drink" are included in variable data scheduled to be delivered to the printing device 102. Even in such a case, for example, when there is no selling area associated with the category "Luxury grocery item" in the selling area category information, the data with the category of luxury grocery item will be excluded from targets of extraction. Further, it is assumed that a selling area set as "Drink counter" is associated with the category "Drink". Thus, data with the category of drink is a target for extraction, and the information thereon is displayed in the print execution instruction windows 801 and 811 as a candidate for print targets.

In S1004, the POP print application 403 determines whether or not the print execution instruction button 804 is pressed (that is, whether or not execution of printing is instructed).

If the POP print application 403 determines in S1004 that the print execution instruction button 804 is not pressed, the POP print application 403 continuously waits for the print execution instruction button 804 to be pressed.

Then, if the POP print application 403 determines in S1004 that the print execution instruction button 804 is pressed (that is, execution of printing is instructed), the POP print application 403 proceeds with the process to S1005.

In S1005, the POP print application 403 sorts the order in which a series of print images are printed so that the series of print images designated as the target of printing via the checkbox 802 or 812 are printed on an associated selling area basis. The POP print application 403 stores and thereby holds a sort result of the series of print images to be printed in the DRAM 303 as print order information. Note that, in the present embodiment, the print order information is a list of pieces of attribute information about print images, which is configured to include information about a product name, a base price, a comment, a size, and the like acquired from the variable data 510 or information about selling area or the like acquired from the selling area registration information. For example, the attribute information may be formed as text data. Note that, as long as the POP print application 403 can recognize attribute information on each print image, the type of data forming the attribute information may be another type of data without being limited to text data. As a specific example, data forming the attribute information may be configured as data encoded by a predetermined encoding scheme.

The acquired information about a selling area (for example, a name of a selling area) is determined by the category 511 included in the variable data 510 and selling area category information held by the POP print application 403.

As a specific example, in the example illustrated in FIG. 5, "104" is set as information indicating a category in data 513 of a print image corresponding to a product with a product name of "Water" included in the variable data 510. Further, in the selling area category information, the information "104" indicating the category is associated with "Drink". Thus, information about a selling area acquired from the selling area registration information in order to be combined with the data 513 on the print image corresponding to a product with a product name of "Water" represents a selling area (for example, a drink counter) associated with "Drink". Then, for example, the list of the above attribute information (for example, text data) sorted by selling area name is held as print order information.

Note that the process of S1003 corresponds to the process of S612 illustrated in FIG. 6, and the processes of S1004 to S1005 correspond to the process of S613 illustrated in FIG. 6.

In S1006, based on the print order information held in S1005, the POP print application 403 requests the data transmission request receiving unit 205 for transmission of print image data targeting a top print image of the series of print images that have not yet been printed. The POP print application 403 then receives print image data from the data transmission request receiving unit 205 as a response to the request.

In S1007, the POP print application 403 outputs the print image data received in S1006 to the print image forming unit 401. Accordingly, a print image is formed based on the print image data by the print image forming unit 401, and the printing data is generated based on the print image.

In S1008, the POP print application 403 outputs the printing data generated by the print image forming unit 401 to the print control unit 402. Accordingly, a process related to printing based on the printing data is performed by the print control unit 402.

In S1009, the POP print application 403 determines whether or not printing is completed for all of the series of print images to be printed.

If the POP print application 403 determines in S1009 that a not yet printed print image remains, the POP print application 403 proceeds with the process to S1006. In such a case, the process on and after S1006 is again performed targeting the not yet printed print image.

In contrast, if the POP print application 403 determines in S1009 that printing is completed for all of the series of print images to be printed, the POP print application 403 proceeds with the process to S1010.

Note that the processes of S1006, S1007, and S1008 correspond to the processes of S614, S615, and S616 in FIG. 6, respectively.

In S1010, in response to an instruction via the list print instruction button 803, the POP print application 403 determines whether or not setting of performing printing of the list of print materials is already made.

If the POP print application 403 determines in S1010 that setting of performing printing of the list of print materials is already made, the POP print application 403 proceeds with the process to S1011.

In contrast, if the POP print application 403 determines in S1010 that setting of performing printing of the list of print materials is not yet made, the POP print application 403 ends the series of processes illustrated in FIG. 10.

In S1011, the POP print application 403 performs the process related to printing of the list of a series of print materials collectively printed by the processes of S1006 to S1009. This list is printed in a state where the print order information that is a list of attribute information about the print materials created in S1005 is presented so that the user can identify the print order information. As a specific example, the list is printed in a manner as illustrated in FIG. 9 as an example in which the print order information is text data.

An example of the list of print materials to be printed when the process of S1011 is performed by the POP print application 403 will now be described with reference to FIG. 9. A print material list 901 is used for the purpose of helping the user when the user tries to understand the overview of a large number of printed print images, for example. In the example illustrated in FIG. 9, information on a product name, a price, a comment, a size, and the like included in the variable data 510 or information on the selling area name or the like associated with a category are printed as a list. In S1005, since the print images have been sorted, the list in FIG. 9 is a list in which the variable data is sorted by selling area.

Note that the example illustrated in FIG. 9 is a mere example, the type of the information is not limited to text data as long as the user is able to identify each printed information as a list. For example, information associated with each selling area may be displayed as an image such as an icon.

Further, the process of S1011 corresponds to the process of S617 illustrated in FIG. 6.

As set forth, an example of the process of the image forming system according to the present embodiment has been described with reference to FIG. 6 to FIG. 10.

As described above, in the image forming system according to the present embodiment, when a large number of print images are printed based on print image data transmitted from the image distribution device 101, these large number of print images are sorted by selling area, and each print image is then printed. Further, in this process, a list is printed in which pieces of attribute information about respective ones of a series of print images to be printed are arranged in accordance with the order in which the series of print images are printed, and the arranged pieces of attribute information are presented as information that the user can identify (for example, text data). Accordingly, the user can easily understand the overview of the large number of print materials by utilizing such an additionally printed list even without confirming each of these large number of print materials individually.

First Modified Example

As modified examples to the image forming system according to the present embodiment, two modified examples indicated as Modified example 1 and Modified example 2 will be described, respectively.

Modified Example 1

First, an image forming system according to Modified example 1 will be described. In the embodiment described above, the order in which a series of print images are printed is sorted so that the series of printed images to be printed are printed on an associated selling area basis, and the print materials are then output. In contrast, the image forming system according to the present modified example performs sorting a series of print images in the same manner as in the embodiment described above and then inserts a partition between print materials at a timing when the selling areas associated with the print materials are switched during the print materials being sequentially output. In the present modified example, such a mechanism is introduced to achieve improved user convenience when attachment of print materials is performed.

Figure 11:
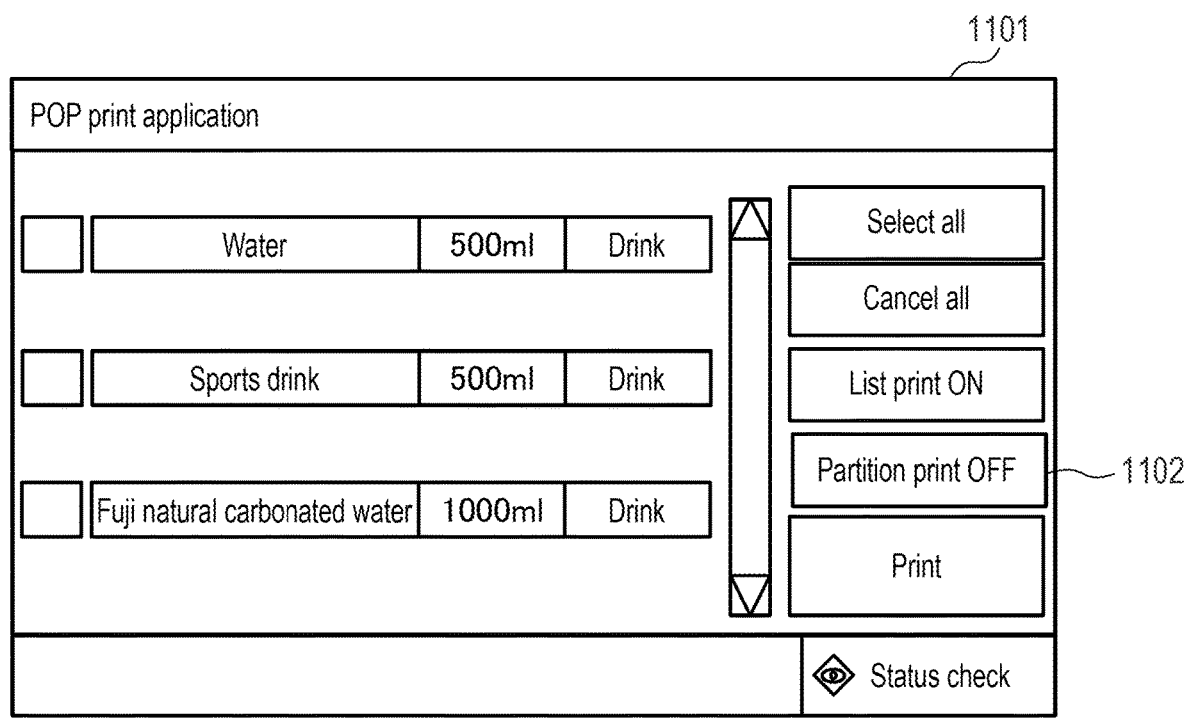
FIG. 11 is a diagram illustrating an example of a print execution instruction window.

First, an example of a print execution instruction window in the image forming system according to the present modified example will be described with reference to FIG. 11. The print execution instruction window 1101 illustrated in FIG. 11 differs from the print execution instruction window 801 illustrated in FIG. 8A in that a partition print button 1102 is added, and the print execution instruction window 1101 is substantially the same as the print execution instruction window 801 for the remaining features. Accordingly, the print execution instruction window 1101 will be described focusing on features different from the print execution instruction window 801, and detailed description of substantially the same features as the print execution instruction window 801 will be omitted.

The partition print button 1102 is a button for receiving an instruction from the user as to whether or not to insert a sheet that is a partition (hereafter, also referred to as a partition sheet) between print materials that are of different types under a situation where a series of print materials are sequentially output. For example, the partition print button 1102 may be implemented as a button switched to an ON state and an OFF state alternatingly when pressed.

In the present modified example, for example, once the partition print button 1102 is operated to the ON state, a partition sheet is inserted between print materials at a timing when selling areas associated with print materials are switched during the print materials being sequentially output on an associated selling area basis.

Figure 12:
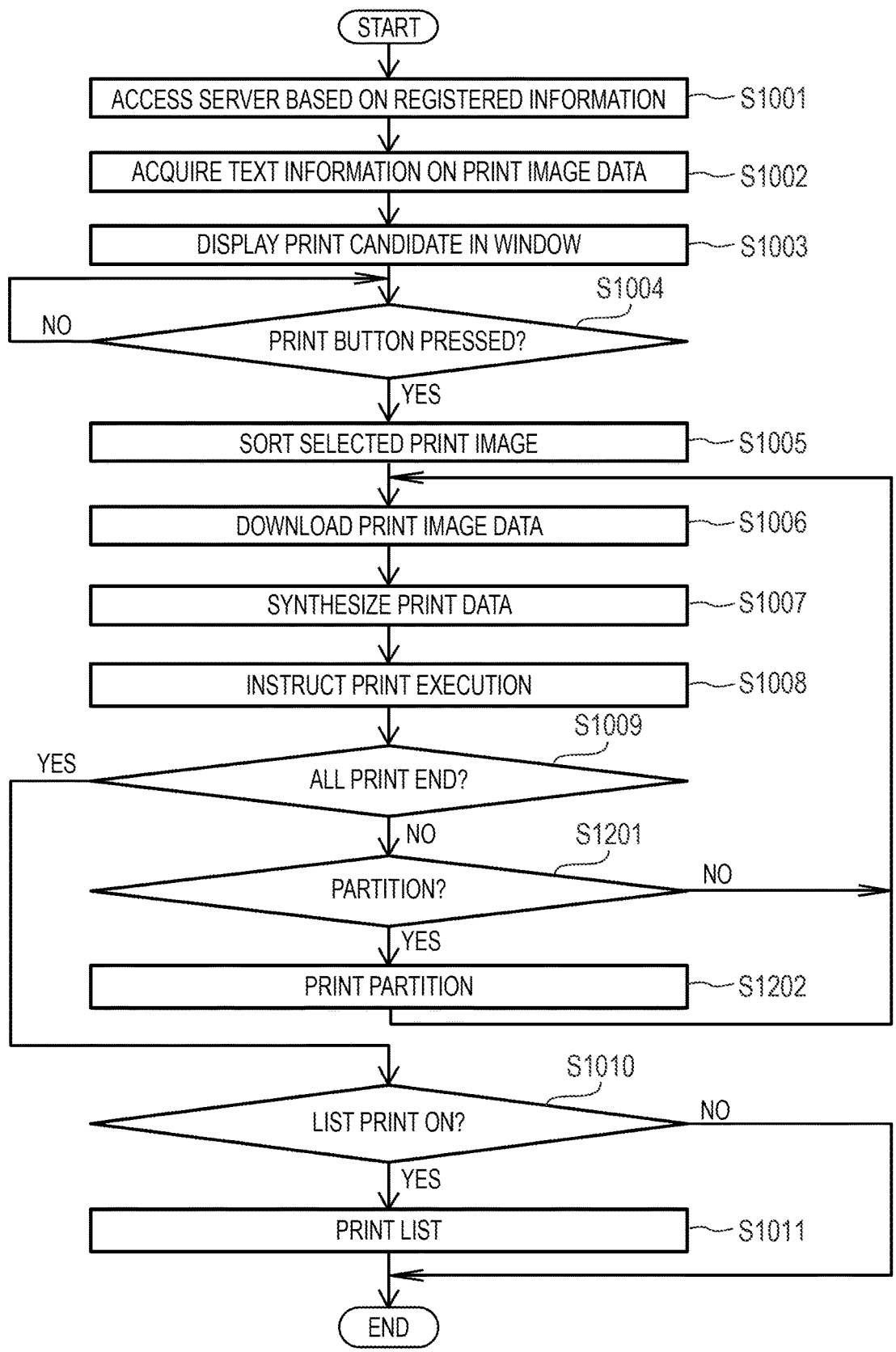
FIG. 12 is a flowchart illustrating an example of a process of the printing device.

Next, an example of the process of the image forming system according to the present modified example will be described with reference to FIG. 12, in particular, focusing on the flow of the POP print process implemented by the POP print application 403. The example illustrated in FIG. 12 differs from the example illustrated in FIG. 10 in that the processes of S1201 and S1202 are added. Thus, the example illustrated in FIG. 12 will be described focusing on different features from the example illustrated in FIG. 10, and detailed description of substantially the same features as the example illustrated in FIG. 10 will be omitted. Further, for example, a series of processes illustrated in FIG. 12 are implemented when the CPU 301 of the printing device 102 loads a program of the POP print application 403 stored in the eMMC 302 or the storage device 304 into the DRAM 303 and executes the program in the same manner as the example illustrated in FIG. 10. Further, in the example illustrated in FIG. 12, each process will be described as being performed by the POP print application 403 as the subject to simplify the illustration in the same manner as the example illustrated in FIG. 10.

In S1009, the POP print application 403 determines whether or not printing is completed for all of the series of print images to be printed.

If the POP print application 403 determines in S1009 that the printing is completed for all of the series of print images to be printed, the POP print application 403 proceeds with the process to S1010. This process and subsequent process are the same as those of the example illustrated in FIG. 10.

In contrast, in the example illustrated in FIG. 12, if the POP print application 403 determines in S1009 that a not yet printed print image remains, the POP print application 403 proceeds with the process to S1201.

In S1201, the POP print application 403 determines, based on an instruction via the partition print button 1102, whether or not the setting related to insertion of a partition sheet is in the ON state and, based on the print image to be next printed, whether or not the associated selling area is switched. In this determination, the POP print application 403 can identify a selling area associated with a targeted print image (for example, a print image to be printed next) by referencing the print order information, for example.

If the POP print application 403 determines in S1201 that the setting related to insertion of a partition sheet is in the OFF state or determines that the associated selling area is not switched even in the print image to be next printed, the POP print application 403 proceeds with the process to S1006. In such a case, the processes on and after S1006 are again performed targeting the not yet printed print image.

In contrast, if the POP print application 403 determines in S1201 that the setting related to insertion of a partition sheet is in the ON state and that, based on the print image to be next printed, the associated selling area is switched, the POP print application 403 proceeds with the process to S1202.

In S1202, the POP print application 403 performs the process related to output of a partition sheet. As a specific example, the POP print application 403 may instruct the print control unit 402 to print a partition image indicating the partition sheet and thereby cause the print control unit 402 to perform the process related to printing of the partition image. Accordingly, the partition sheet that is a sheet with the partition image printed thereon is output.

The POP print application 403 then proceeds with the process to S1206. Accordingly, the process on and after S1006 is again performed targeting the print image that has not yet been printed.

With the control described above being applied, a partition sheet is inserted between print materials at a timing when selling areas associated with the print materials are switched during the print materials being sequentially output. This enables the user to easily classify a series of output print materials (for example, POPs) on a selling area basis with respect to the partition sheet as a reference when attachment of the print materials is performed. As described above, according to the image forming system of the present modified example, an advantageous effect of improved user convenience when attachment of print materials is performed can be expected.

Second Modified Example

Next, an image forming system according to Modified example 2 will be described. In the image forming system according to the embodiment described above, the image distribution device 101 and the printing device 102 transfer various data (for example, print image data or the like) through direct communication. In contrast, the image forming system according to the present modified example differs from the image forming system according to the embodiment described above in that an information processing device 1301 implemented by a PC or the like intervenes between the image distribution device 101 and the printing device 102.

Figure 13:
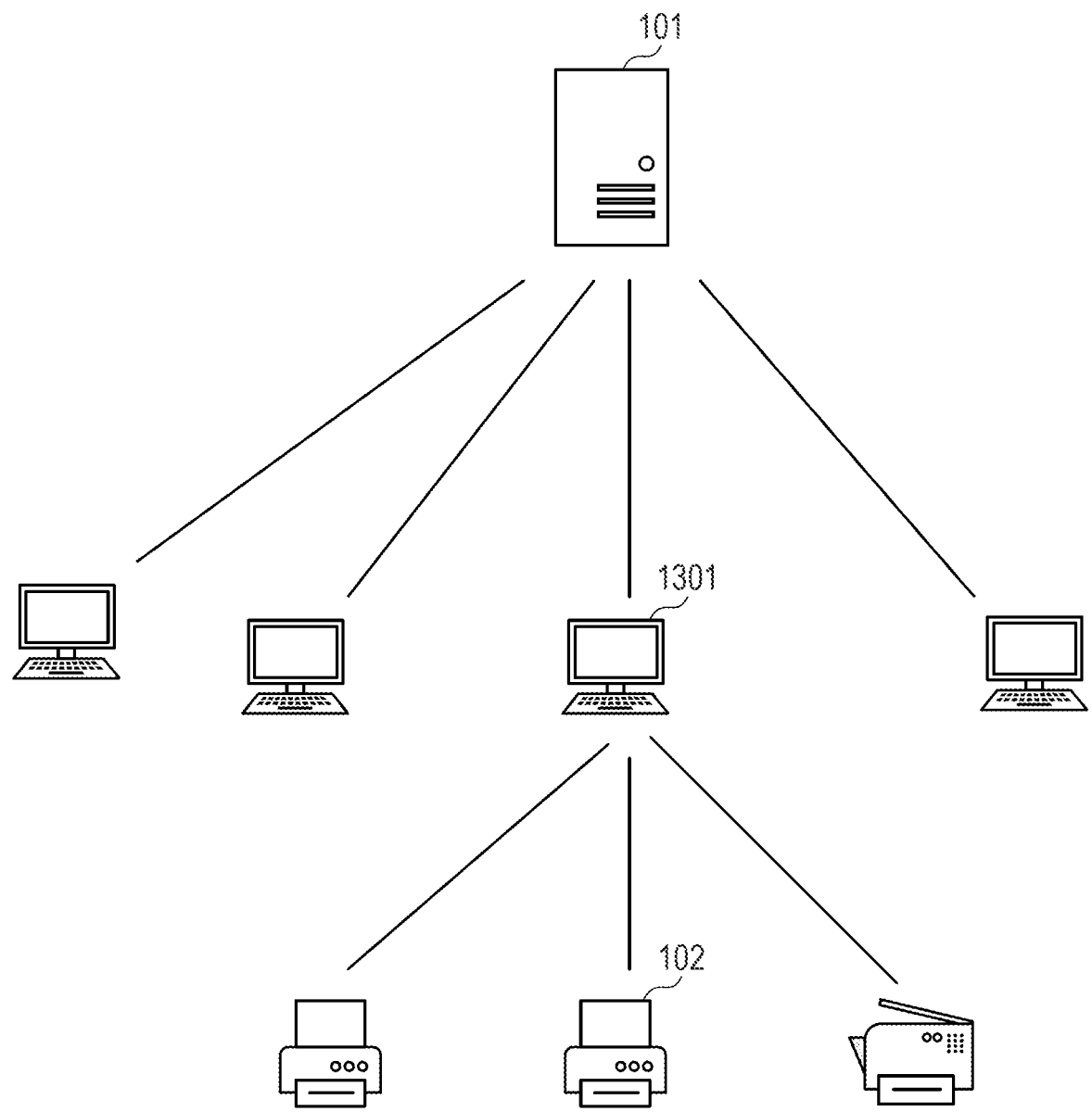
FIG. 13 is a diagram illustrating an example of a system configuration of the image forming system.

For example, FIG. 13 is a diagram illustrating an example of a system configuration of the image forming system according to the present modified example. The information processing device 1301 serves as the information processing device 103 in the embodiment described above. Further, in the example illustrated in FIG. 13, the information processing device 1301 has a function of the POP print application 403. Under such a configuration, the POP print application 403 that operates in the information processing device 1301 communicates with software operating in the printing device 102 and software operating in the image distribution device 101, respectively. With such a mechanism, substantially the same function as the image forming system according to the embodiment described above can be provided also in the image forming system according to the present modified example.

In addition, in the present modified example, the POP print application 403 that operates in the information processing device 1301 may combine frame image data and variable data to form a print image and generate printing data based on the print image.

Other Embodiments

The embodiment and various modified examples described above are mere examples and are not necessarily intended to limit the configuration or the process of the present invention, and various modifications or changes may be added within the scope not departing from the technical concept of the present invention.

As a specific example, in the embodiment described above, the printing device 102 sorts the order in which a series of print images are printed. On the other hand, the image distribution device 101 may be configured to sort the order in which a series of print images are printed. In such a case, the printing device 102 is not always required to sort a series of print images described as the process of S1005 in FIG. 10 or the process related to generation of print order information in accordance with a result of the sorting. Instead, the image distribution device 101 can sort the order in which a series of print images based on the print image data to be transmitted to the targeted printing device 102 are printed, generate print order information in accordance with a result of the sorting, and then transmit the print order information to the printing device 102. Even in such a case, the order in which the series of print images are printed and the order in which pieces of attribute information about respective print images are arranged in the generated list will match, and this enables the user to easily understand the overview of a large number of print materials by utilizing the list.

Further, as another example, in the embodiment described above, the printing device 102 forms the print image 520 based on the frame image data 500 and the variable data 510. On the other hand, the image distribution device 101 can be configured to form the print image 520 based on the frame image data 500 and the variable data 510. In such a case, the image distribution device 101 can transmit the series of formed print images to the printing device 102. Further, in such a case, the printing device 102 can receive a series of print images from the image distribution device 101 and generate printing data based on the series of print images.

According to the present disclosure, the present invention allows the user to easily understand information about each of a series of print materials to be printed.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-039257, filed on Mar. 14, 2022, which is hereby incorporated by reference herein in its entirety.

What is claimed is:

1. A printing device that communicates with an image distribution device, the printing device comprising:
  a controller configured to:
   form a print image by combining first data and second data, the first data and the second data being included in print image data managed by the image distribution device, the first data including an image applied commonly to a plurality of print materials, and the second data including information changed on the print image basis and category information indicating a category of the print material, wherein the category information is associated with information indicating a use place of the print image;
   generate a list of pieces of attribute information about print images formed based on the print image data, wherein the attribute information includes the information indicating the use place specified based on the category information; and
   perform control so that the print images and the list are printed by the printing device.

2. The printing device according to claim 1, wherein the controller generates the list in which the attribute information is presented as text data.

3. The printing device according to claim 1, further comprising:
  a display device configured to display information about the print images formed based on the print image data; and
  wherein the controller is further configured to:
   receive, from a user, designation of one or more print images to be one or more print candidates out of the print images,
   wherein the controller generates the list targeting the one or more print images designated as the one or more print candidates, and
   wherein the controller performs control so that the one or more print images designated as the print candidate and the list are printed.

4. The printing device according to claim 1, wherein the controller is further configured to:
  based on the attribute information indicating the use place associated with information indicating the category included in the second data used in formation of respective ones of the print images formed based on print image data, sort order in which the print images are printed,
  wherein the controller generates the list in which the pieces of attribute information are arranged in accordance with the sorted order.

5. The printing device according to claim 4, wherein the controller sorts the order in which the print images are printed so that the print images are printed for each use place with which the series of print images are associated as attribute information.

6. The printing device according to claim 4,
  wherein the image distribution device comprises a controller configured to a manage candidates for the information indicating the category, and
  wherein the information indicating the category managed by the image distribution device is included in the second data.

7. A control method of a printing device: the control method comprising:
  forming a print image by combining first data and second data, the first data and the second data being included in print image data managed by the image distribution device, the first data including an image applied commonly to a plurality of print materials, and the second data including information changed on the print image basis and category information indicating a category of the print material, wherein the category information is associated with information indicating a use place of the print image;
  generating a list of pieces of attribute information about print images formed based on the print image data, wherein the attribute information includes the information indicating the use place specified based on the category information; and
  performing control so that the print images and the list are printed by the printing device.

8. A non-transitory computer storage medium strong a program for executing a control method of a printing device, the control method comprising:
  forming a print image by combining first data and second data, the first data and the second data being included in print image data managed by the image distribution device, the first data including an image applied commonly to a plurality of print materials, and the second data including information changed on the print image basis and category information indicating a category of the print material, wherein the category information is associated with information indicating a use place of the print image;
  generating a list of pieces of attribute information about print images formed based on the print image data, wherein the attribute information includes the information indicating the use place specified based on the category information; and performing control so that the print images and the list are printed by the printing device.

* * * * *